(12) United States Patent
Zhang et al.

(10) Patent No.: US 7,820,323 B1
(45) Date of Patent: Oct. 26, 2010

(54) METAL BORATE SYNTHESIS PROCESS

(75) Inventors: Shengshui Zhang, Olney, MD (US);
Conrad Xu, North Potomac, MD (US);
T. Richard Jow, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 993 days.

(21) Appl. No.: 11/518,748

(22) Filed: Sep. 7, 2006

(51) Int. Cl.
*H01M 6/04* (2006.01)
*C08G 79/08* (2006.01)

(52) U.S. Cl. .................. 429/188; 429/305; 429/310; 429/311; 528/394

(58) Field of Classification Search ............... 429/308
See application file for complete search history.

(56) References Cited

U.S. PATENT DOCUMENTS

| | | | |
|---|---|---|---|
| 4,026,905 A | 5/1977 | Cohen et al. | |
| 4,209,465 A | 6/1980 | Austin et al. | |
| 4,313,843 A | 2/1982 | Bollyky et al. | |
| 4,496,730 A | 1/1985 | Chen et al. | |
| 4,505,997 A | 3/1985 | Armand et al. | |
| 4,552,825 A | 11/1985 | Chen et al. | |
| 4,885,228 A | 12/1989 | Inagaki et al. | |
| 4,900,854 A | 2/1990 | Winterton et al. | |
| 5,021,129 A | 6/1991 | Arbach et al. | |
| 5,273,840 A | 12/1993 | Dominey | |
| 5,395,862 A | 3/1995 | Nickers et al. | |
| 5,397,675 A | 3/1995 | Arimatsu et al. | |
| 5,508,130 A | 4/1996 | Golovin | |
| 5,514,493 A | 5/1996 | Waddell et al. | |
| 5,623,023 A | 4/1997 | Nishikubo | |
| 5,641,577 A | 6/1997 | Naruse et al. | |
| 5,652,072 A | 7/1997 | Lamanna et al. | |
| 5,683,832 A | 11/1997 | Bonhote et al. | |
| 5,827,602 A | 10/1998 | Koch et al. | |
| 5,874,616 A | 2/1999 | Howells et al. | |
| 5,916,475 A | 6/1999 | Michot et al. | |
| 5,972,544 A | 10/1999 | Carr et al. | |
| 6,010,806 A | 1/2000 | Yokoyama et al. | |
| 6,063,467 A | 5/2000 | Kanno | |
| 6,133,431 A | 10/2000 | Yasuda et al. | |
| 6,185,089 B1 | 2/2001 | Mita et al. | |
| 6,210,830 B1 | 4/2001 | Sartori et al. | |
| 6,315,918 B1 | 11/2001 | Mita et al. | |
| 6,319,428 B1 | 11/2001 | Michot et al. | |
| 6,331,204 B1 | 12/2001 | Carr et al. | |
| 6,344,497 B1 | 2/2002 | Meyrick et al. | |
| 6,365,301 B1 | 4/2002 | Michot et al. | |
| 6,407,232 B1 | 6/2002 | Tsujioka et al. | |
| 6,423,454 B1 | 7/2002 | Heider et al. | |
| 6,429,587 B1 | 8/2002 | Sugimachi et al. | |
| 6,461,773 B1 | 10/2002 | Tsujioka et al. | |
| 6,485,868 B1 | 11/2002 | Tsujioka et al. | |
| 6,506,516 B1 | 1/2003 | Wietelmann et al. | |
| 6,522,463 B1 | 2/2003 | Shimomura et al. | |
| 6,537,512 B1 | 3/2003 | Friedrich et al. | |
| 6,559,222 B1 | 5/2003 | Rooney et al. | |
| 6,576,627 B1 | 6/2003 | Fushihara | |
| 2002/0033661 A1 | 3/2002 | Sugimachi et al. | |
| 2002/0081496 A1* | 6/2002 | Tsujioka et al. | ............ 429/307 |
| 2002/0153253 A1 | 10/2002 | Nishino et al. | |
| 2002/0160261 A1 | 10/2002 | Schmidt et al. | |
| 2002/0183204 A1 | 12/2002 | Nomura | |
| 2003/0108800 A1 | 6/2003 | Barbarich | |
| 2003/0119787 A1 | 6/2003 | Fushihara | |
| 2003/0128264 A1 | 7/2003 | Ishikawa et al. | |
| 2004/0054126 A1* | 3/2004 | Angell et al. | ............... 528/394 |
| 2004/0191635 A1* | 9/2004 | Otsuki et al. | ............... 429/326 |

FOREIGN PATENT DOCUMENTS

| | | |
|---|---|---|
| DE | 19829030 C1 | 7/1999 |
| JP | 56145113 A | 11/1981 |
| JP | 10337959 A | 2/1998 |
| JP | 63215723 A | 9/1998 |
| SU | 1013405 | 4/1983 |

OTHER PUBLICATIONS

J. Barthel, A. Schmid, and H. J. Gores, "A New Class of Electrochemically and Thermally Stable Lithium Salts for Lithium Battery Electrolytes," Journal of the Electrochemical Society (2000), 21-24, 147(1), The Electrochemical Society.

Kang Xu, Shengshui Zhang, T. Richard Jow, Wu Xu, and C. Austen Angell, "LiBOB as Salt for Lithium-Ion Batteries: A Possible Solution for High Temperature Operation," Electrochemical and Solid-State Letters (2002), A26-A29, 5(1), The Electrochemical Society.

S.S. Zhang, K. Xu, and T.R. Jow, "Low-temperature performance of Li-ion cells with a $LiBF_4$-based electrolyte," J. Solid State Electrochem (2003), 147-151, 7.

H.S. Lee, X.Q. Yang, C.L. Xiang, and J. McBreen, "The Synthesis of a New Family of Boron-Based Anion Receptors and the Study of Their Effect on Ion Pair Dissociation and Conductivity of Lithium Salts in Nonaqueous Solutions," Journal of the Electrochemical Society (Aug. 1998), vol. 145, No. 8.

* cited by examiner

*Primary Examiner*—Dah-Wei D Yuan
*Assistant Examiner*—Jacob Marks
(74) *Attorney, Agent, or Firm*—William W. Randolph; A. David Spevack

(57) ABSTRACT

The carboxyl borate represents a novel liquid that upon reaction with lithium halide produces a lithium ion electrochemical device electrolyte upon dissolution in an aprotic solvent mixture.

5 Claims, 12 Drawing Sheets

METAL BORATE SYNTHESIS PROCESS

GOVERNMENT INTEREST

The invention described herein may be manufactured, used, and licensed by or for the United States Government.

FIELD OF THE INVENTION

The present invention generally relates to a process for the synthesis of metal borates and in particular to a process for preparing a metal borate through the reaction of boric acid and a carboxylic acid.

BACKGROUND OF THE INVENTION

Rechargeable lithium ion batteries have been commercially available for well over a decade. Lithium hexafluorophosphate ($LiPF_6$) is commonly employed as the electrolyte salt in lithium ion batteries. Lithium hexafluorophosphate is characterized by solubility in aprotic solvents that results in an electrolyte characterized by high electrical conductivities and electrochemical stability. However, lithium hexafluorophosphate has limited applicability in future lithium ion batteries owing to a lack of thermal stability. In solution, lithium hexafluorophosphate dissociates into lithium fluoride and phosphorus pentafluoride which are then free to cationically polymerize electrolyte solvents. Additionally, lithium hexafluorophosphate releases hydrofluoric acid upon contact with moisture. Lithium hexafluorophosphate hydrolysis not only impedes safe handling but also leads to the degradation of transition metal oxides often utilized in electrochemical cells as a cathode material.

Considerable efforts have been made to develop alternative conducting salts to lithium hexafluorophosphate. Representative of these efforts is U.S. Pat. No. 4,505,997 that describes the use of lithium bis(trifluoromethylsulfonyl)imide and lithium tris(trifluoromethylsulfonyl)methanide salts for use in battery electrolytes. U.S. Pat. Nos. 5,874,616 and 6,319,428 describe the use of lithium perfluoro amide salts as battery electrolytes. While these salts display high anodic stability and form solutions having high electrical conductivity with organic carbonates, these same salts suffer the limitation of not adequately passivating aluminum. This is problematic since aluminum is a commonly used current collector for battery cathodes. Additionally, these salts tend to be comparatively difficult to produce and purify.

U.S. Pat. Nos. 6,210,830 and 6,423,454 describe perfluoro- or partially fluorinated-alkyl fluorophosphates as lithium ion battery electrolytes. While the thermal stability and hydrolysis resistance of these compounds as lithium salts are superior to lithium hexafluorophosphate, these salts are comparatively difficult to produce and as such significantly add to production costs for lithium ion batteries containing these salts. Barthel et al. (Journal of Electrochemical Society, 147, 2000, 21) teaches lithium organoborates as an electrolyte salt. These salts have met with limited acceptance owing to the inability to withstand high anodic potentials and the formation of unstable triorganoboranes.

DE 19829030 C1 and U.S. Pat. No. 6,506,516 describe lithium bisoxalatoborate as a battery electrolyte salt. Xu et al. (Electrochemical and Solid-State Letters, 5, 2002, A26) note that lithium bisoxalatoborates readily passivate aluminum, show good thermal stability, yet have met with limited acceptance owing to the poor solubility of bisoxalatoborate in conventional lithium ion battery organic solvents.

Zhang et al. (Journal of Solid State Electrochemistry, 7, 2003, 147) teach the use of lithium tetrafluoroborate as a lithium ion battery electrolyte salt demonstrating good cycling performance at low temperatures. However, lithium tetrafluoroborate suffers from comparatively low ionic conductivity which limits battery power density.

U.S. Pat. No. 6,407,232 and Patent Application Publication Nos. 2002/0022181, 2002/0081496 and 2003/0100761 teach a class of cyclic compounds, some of which are lithium salts, which appear to offer lithium ion battery salts having good overall properties. However, the process of synthesizing such cells is inherently dangerous and inefficient.

Thus, there exists a need for an efficient process for the production of lithium ion battery salts.

SUMMARY OF THE INVENTION

A process for preparing a metal borate includes forming a carboxyl borate through the reaction of boric acid with a carboxylic acid followed by reaction of the resulting carboxyl borate with a halide salt.

A carboxyl borate is provided of the formula:

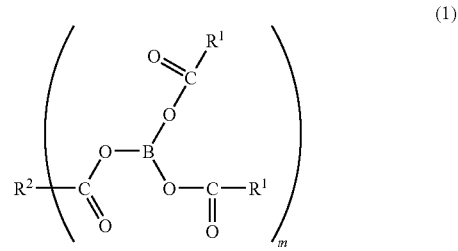

or

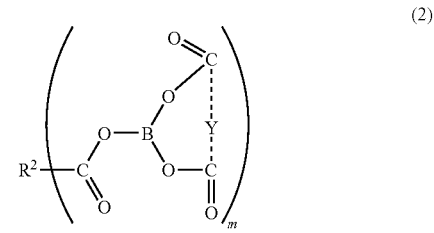

where $R^1$ independently in each occurrence is hydrogen, a halogen, $C_1$-$C_{12}$ alkyl, $C_6$-$C_{14}$ aryl, $C_1$-$C_{12}$ fluoroalkyl, or heteroatom substituted $C_1$-$C_{12}$ alkyl where the heteroatom is oxygen, sulfur or nitrogen; where m is 1 or 2; where when m is 1, $R^2$ is hydrogen,

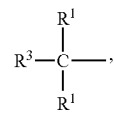

or

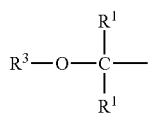

and when m is 2, $R^2$ is a nullity,

or

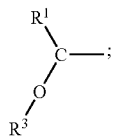

$R^3$ is independently in each occurrence hydrogen, alkali metal ion, fluorine, $C_1$-$C_{12}$ alkyl $C_6$-$C_{14}$ aryl, $C_1$-$C_{12}$ fluoroalkyl, or heteroatom substituted $C_1$-$C_{12}$ alkyl where the heteroatom is oxygen, sulfur or nitrogen; and Y is a $C_0$-$C_{10}$ alkylene, $C_1$-$C_{12}$ fluoroalkylene, $C_4$-$C_{18}$ arylene, or $C_4$-$C_{18}$ fluoroarylene.

An operative electrolyte includes a compound produced by an inventive process and a synergistic mixture of aprotic solvents. An inventive electrolyte is operative to produce an electrochemical device.

DESCRIPTION OF THE PREFERRED EMBODIMENTS

Figure 1:
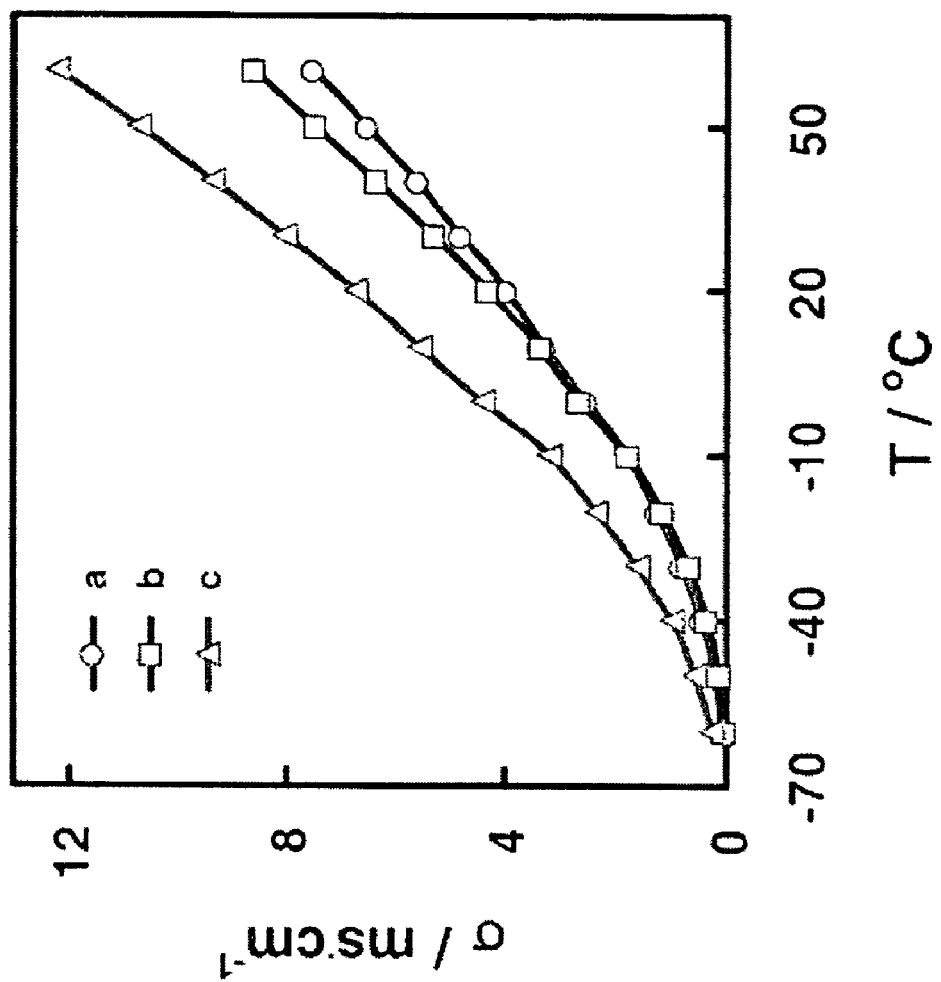
FIG. 1 is a plot showing ionic conductivities of 1.0 molar lithium oxalyldifluoroborate (LiODFB) dissolved in different solvent mixtures. (a) 1:1:3 (wt.) propylene carbonate-ethylene carbonate-ethyl methyl carbonate (PC-EC-EMC), (b) 3:3:4 PC-EC-EMC, and (c) 1:1:3 EC-EMC-gamma-butyrolactone (GBL)

The present invention has utility in the production of lithium ion electrolytes, as well as novel polydentate ligands. According to the present invention, a large number of conventional and novel metal borates are formed through a process involving a carboxyl borate intermediate. Through a robust and simple synthetic process, electrochemically stable lithium salts in particular are produced that have solubility in a variety of aprotic solvents conventional to the battery industry and provide high ionic conductivity over a variety of temperatures. As a result, inventive metal borates are operative to extend and/or improve the life and/or performance of electrochemical devices such as battery cells, capacitors, electrolytic cells, and supercapacitors.

According to the present invention, a compound having the formula:

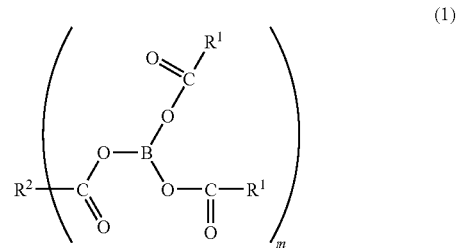

(1)

or

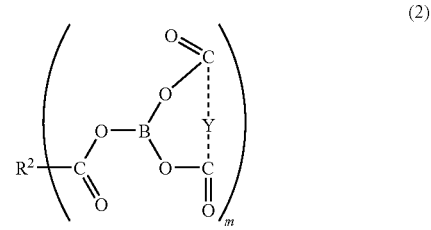

(2)

is produced from the reaction of a carboxylic acid with boric acid ($H_3BO_3$). In the general formulas (1) and (2) where $R^1$ is independently in each occurrence hydrogen, a halogen, $C_1$-$C_{12}$ alkyl, $C_6$-$C_{14}$ aryl, $C_1$-$C_{12}$, fluoroalkyl, or heteroatom substituted $C_1$-$C_{12}$ alkyl where the heteroatom is oxygen, sulfur or nitrogen; where m is 1 or 2; where when m is 1, $R^2$ is hydrogen,

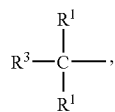

or

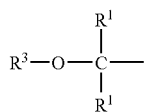

when m is 2, $R^2$ is a nullity,

or

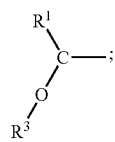

$R^3$ is independently in each occurrence hydrogen, alkali metal ion, fluorine, $C_1$-$C_{12}$ alkyl $C_6$-$C_{14}$ aryl, $C_1$-$C_{12}$ fluoroalkyl, or heteroatom substituted $C_1$-$C_{12}$ alkyl where the heteroatom is oxygen, sulfur or nitrogen; and Y is a $C_0$-$C_{10}$ alkylene, $C_1$-$C_{12}$ fluoroalkylene, $C_4$-$C_{18}$ arylene, or $C_4$-$C_{18}$ fluoroarylene. Preferably, three equivalents of carboxylic acid group are provided per molecule of boric acid. It is appreciated that a carboxylic acid operative herein illustratively includes monoacids, diacids, and triacids. Representative monoacids illustratively include $C_1$-$C_{20}$ alkyl carboxylic acids, $C_1$-$C_{20}$ fluoroalkyl carboxylic acids, $C_4$-$C_9$ cycloalkyl carboxylic acids, $C_4$-$C_9$ fluoroalkylcarboxylic acids, $C_7$-$C_{15}$ aryl carboxylic acids and $C_7$-$C_{15}$ fluoroaryl carboxylic acids, and derivatized forms thereof wherein the derivatives included therein include keto, ester, ether, alcohol thioether, and secondary amine, specific examples of monoacids operative herein illustratively include acetic acid, trifluoacetic acid, pentafluoropenzoic acid, the number of carbons.

According to the present invention, as used herein and unless noted to the contrary, an inventive compound is inclusive of the carboxyl carbon and a fluorinated inventive compound is one in which at least one proton is replaced by fluorine.

Representative diacids illustratively include $C_2$-$C_{21}$ alkyl dicarboxylic acids, $C_2$-$C_{21}$ fluoroalkyl dicarboxylic acids, $C_5$-$C_{10}$ cycloalkyl dicarboxylic acids, $C_5$-$C_{10}$ fluoroalkyldicarboxylic acids, $C_8$-$C_{16}$ aryl dicarboxylic acids and $C_8$-$C_{16}$ fluoroaryl dicarboxylic acids, and derivatized forms thereof wherein the derivatives included include keto, ester, ether, thioether, and secondary amine. Specific examples of diacids operative herein illustratively include oxalic, succinic, cyclohexane 1,1 dicarboxylic acid, and perfluorosuccinic acid.

Triacids operative herein illustratively include $C_2$-$C_{21}$ alkyl dicarboxylic acids, $C_2$-$C_{21}$ fluoroalkyl dicarboxylic acids, $C_5$-$C_{10}$ cycloalkyl dicarboxylic acids, $C_5$-$C_{10}$ fluoroalkyldicarboxylic acids, $C_8$-$C_{16}$ aryl dicarboxylic acids and $C_8$-$C_{16}$ fluoroaryl dicarboxylic acids, and derivatized forms thereof wherein the derivatives included therein include keto, ester, ether, thioether, and secondary amine. Specific examples of triacids operative herein illustratively include citric acid, and 1-butane 2,3,4 tricarboxylic acid, and benzentricarboxylic acid. It is appreciated regardless of the number of equivalents of carboxylic acid to boric acid, the carboxylic acid need not be a single carboxylic acid, but rather boric acid is readily reacted with two or more specific carboxylic acids in order to form a reduced symmetry carboxyl borate. A particularly preferred carboxylic acid is $R^3OC(R^1)_2$—COOH where $R^3$ is hydrogen, $C_1$-$C_{12}$ alkyl, $C_1$-$C_{12}$ fluoroalkyl, $C_6$-$C_{14}$ aryl or heteroatom substituted $C_1$-$C_{12}$ alkyl where the heteroatom is oxygen, sulfur or nitrogen and $R^1$ is hydrogen, a halogen, or $C_1$-$C_4$ alkyl. Another preferred monoacid is OH—$C(R^1)_2$—COOH where $R^1$ is as defined above. This particular acid, while a monoacid, forms a five-member ring through action with a borate center. It is appreciated that the addition of a carbon atom intermediate between the carboxyl carbon and hydroxyl carbon serves to form a six-member ring also having considerable thermodynamic stability.

A specific preferred diacid is oxalic acid. The reaction of oxalic acid and boric acid in a molar ratio of 3:2 yields a compound of the formula:

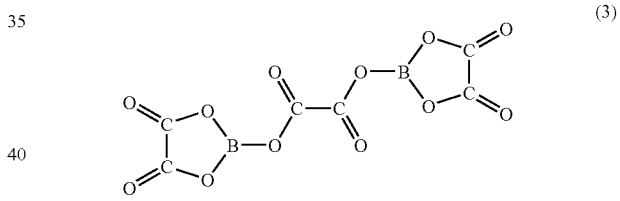

(3)

While the compounds of formulas (1) and (2) have utility as ligands for chelating various metal ions, the electrochemical property of an inventive compound is generally enhanced by subsequent reaction with a metal halide. It is appreciated that a variety of metal halides are operative herein to react with an inventive carboxy borate. Metal halides operative herein illustratively include fluorides of lithium; sodium; potassium; cesium; magnesium; calcium; strontium; transition metals such as silver, zinc, copper, cobalt, iron, nickel, manganese, titanium; metals from groups 13, 14, and 15 such as aluminum, gallium, tin, lead, and bismuth; the corresponding chlorides, and the corresponding bromides. Additionally, it is appreciated that an inventive carboxy borate is also reacted with an organohalide illustratively including the fluoride, chloride or boride salts of tetra alkyl ammonium such as tetramethyl, tetraethyl, tetrabutyl and triethylmethyl; pyridinium, imidazolium, tetra alkyl phosphonium, tetra aryl phosphonium, triaryl sulfonium, and trialkyl sulfonium. Preferably, the metal halide is lithium fluoride when the resulting compound is to be used as a lithium ion electrolyte.

By way of example, reaction of the carboxy borate (3) with four mols of lithium fluoride yields two mols of lithium oxalyldifluoroborate (LiODFB) and one mol of dilithium oxalate.

A typical process for producing an inventive carboxyl borate according to the present invention includes dissolution of the carboxylic acid and boric acid in an aqueous or alcoholic solvent to form a solution. Alcoholic solvents operative herein illustratively include methanol, isopropanol, ethanol, butanol, higher alcohols, and combinations thereof. It is appreciated that other conventional wet or neat organic solvents capable of solvating the carboxylic acid and boric acid reagents are also operative herein and illustratively include acetone, pyridine, and glycerin. Following the formation of a solution, the solvent is removed to create a dry mixture. Further heating of the resulting mixture at a temperature typically between 90-140° C. under vacuum for a time ranging from three to twenty hours yields a carboxyl borate according to formula (1) or (2).

An inventive carboxyl borate of formula (1) or (2) is reacted with a halide salt through interaction at one atmosphere in a solvent such as acetonitriles, ethers, tetrahydrofurans, carbonates, and mixtures thereof. Reaction occurs at temperatures generally ranging from 20° C. to the reflux temperature of the particular solvent. The resulting salt is isolated by conventional purification techniques. It is appreciated that reaction at different pressures is also operative with account for the pressure dependence of solvent properties.

An inventive halogenated electrolyte is operative either in pure form or in combination with other salts known to those skilled in the art. An inventive halogenated borate is operative as an electrolyte salt in primary and secondary batteries, capacitors, super capacitors and electrolytic cells. The concentration of a halogenated borate according to the present invention in an electrolyte is typically between 0.01 and 3 molar, preferably from 0.01 to 2 molar, and most preferably from 0.1 to 1.5 molar.

An inventive halogenated borate is solvated to create an operative electrolyte. The solvent is a mixture of aprotic solvents where aprotic solvents operative herein illustratively include dimethylcarbonate, $(C_1-C_6$ alkyl)-OC(O)—O—$(C_1-C_6$ alkyl), a $C_2-C_8$ alkaline carbonate, a $C_1-C_6$ dialkoxy of a $C_2-C_6$ alkane, a $C_1-C_6$ ester of a $C_2-C_8$ carboxylic acid, a $C_1-C_6$ dialkyl sulfoxide, dioxolane, sulfolane, pyrrolidinones, lactones, acetonitrile, tetrahydrofuran, $C_1-C_6$ alkyl tetrahydrofurans and mixtures thereof. Specific examples of aprotic solvents include dimethyl carbonate, diethyl carbonate, ethyl methyl carbonate, methyl propyl carbonate, propylene carbonate, ethylene carbonate, 1,2-dimethoxyethane, 1,2-diethoxyethane, methyl acetate, gamma-butyrolactone, ethyl acetate, methyl propionate, ethyl propionate, methyl butyrate, ethyl butyrate, dimethyl sulfoxides, dioxolane, sulfolane, 1-methyl-2-pyrrolidinone, acetonitrile, acrylonitrile, tetrahydrofuran, 2-methyltetrahydrofuran and mixtures thereof. According to the present invention, electrolyte solvent is a mixture of at least three solvents that function synergistically to solubilize an inventive halogenated borate, promote thermal stability, and enhance ionic conductivity. Preferably, at least one of the solvents is an alkaline carbonate and a second solvent is $(C_1-C_6$ alkyl)-OC(O)—O—$(C_1-C_6$ alkyl). More preferably, the ratio of alkaline carbonate:$(C_1-C_6$ alkyl)-OC(O)—O—$(C_1-C_6$ alkyl) is in a ratio of 0.1-10:1. Still more preferably, a lactone is present in the solvent mixture.

The following non-limiting examples are provided to further illustrate the present invention. These examples are not intended to limit the scope of the claimed invention, but rather to detail specific aspects thereof.

Example 1

Synthesis of lithium oxalodifluoroborate (LiODFB). 27.0 grams of oxalic acid (0.3 mols) and 12.4 grams of boric acid (0.2 mols) are dissolved in ethanol containing 30% water. The resulting solution is dried with a rotary evaporator. The resulting mixture is heated to 120° C. for six hours. A compound corresponding to formula (3) (0.1 mols) is obtained. The product (3) is dissolved in acetonitrile along with 10.4 grams (0.4 mols) lithium fluoride. The resulting solution is refluxed for six hours to yield LiODFB and dilithium oxalate. High purity LiODFB is obtained by recrystallization using a 1:1 volume ratio of acetonitrile/toluene mixed solvent. The resulting halogenated borate is characterized by thermogravimetric analysis and nuclear magnetic resonance spectroscopy in order to confirm the product as LiODFB.

Example 2

Figure 2:
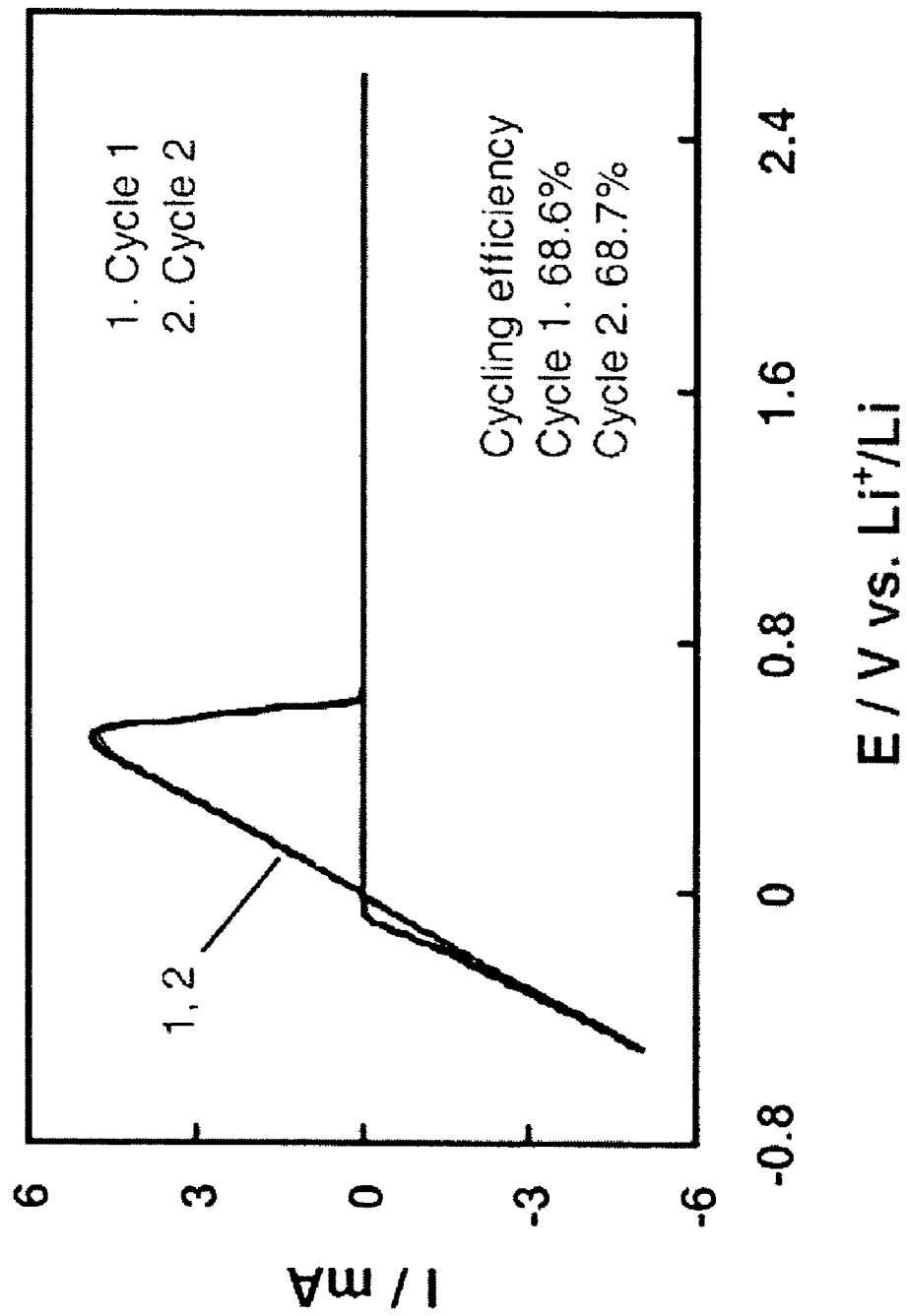
FIG. 2 is a plot showing plating and stripping of lithium on a Cu substrate in 1.0 molar LiODFB 3:3:4 PC-EC-EMC electrolyte, which is conducted at a scanning rate of 5 mV/s.
Figure 3:
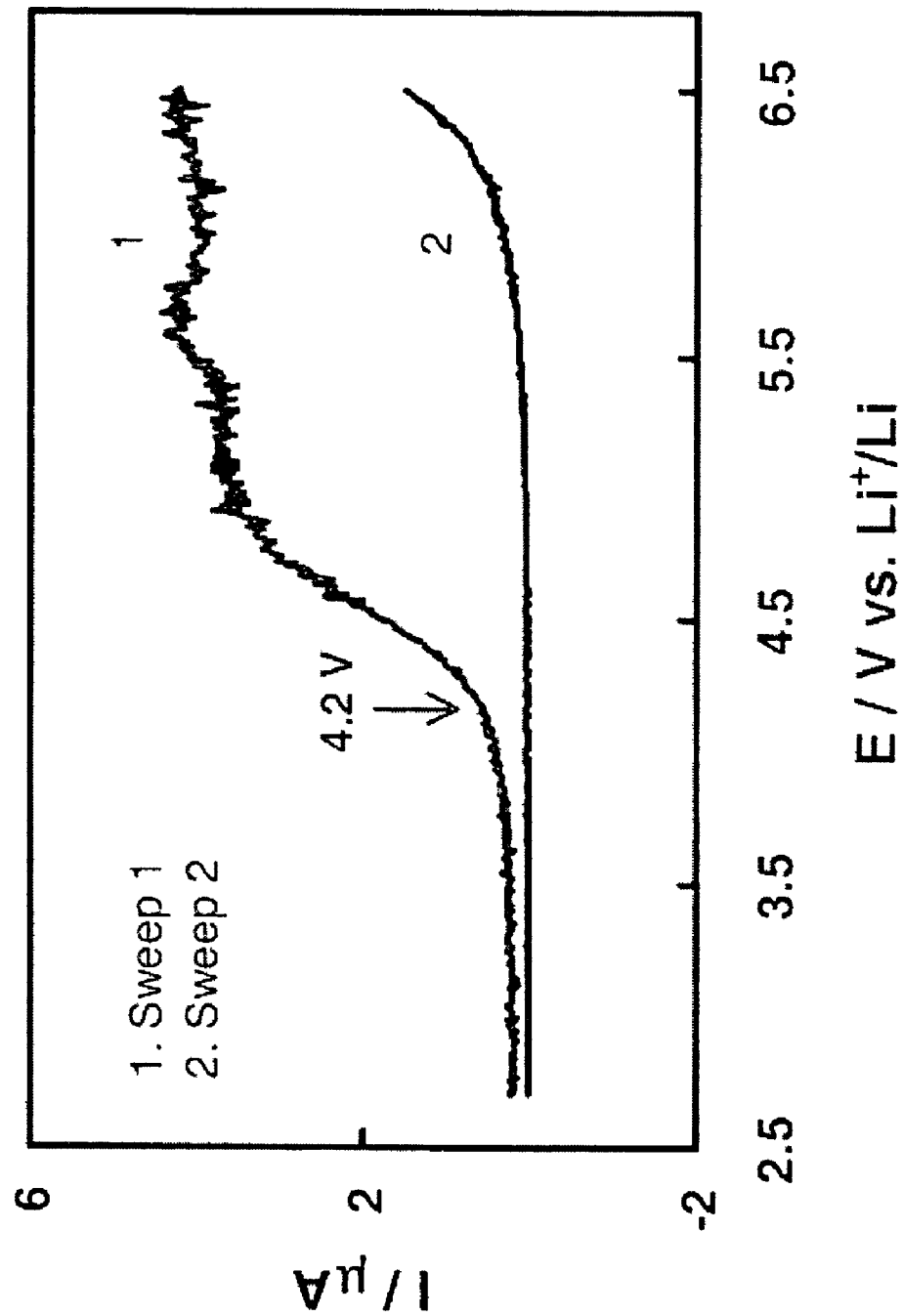
FIG. 3 is a plot showing passivation of aluminum substrate in 1.0 molar LiODFB 3:3:4 PC-EC-EMC electrolyte, which is recorded at a scanning rate of 5 mV/s.

LiODFB electrolyte and its properties. Three electrolytes are prepared by dissolving 1.0 molar LiODFB produced in Example 1 in three solvents in 1:1:3 weight ratio, propylene carbonate (PC)-ethylene carbonate (EC)-ethyl methyl carbonate (ECM), 3:3:4 PC-EC-EMC, and 1:1:3 EC-EMC-gamma-butyrolactone (GBL), respectively. Ionic conductivities of these electrolytes are determined by measuring the impedance of a dip-type two-electrode cell. Ionic conductivities of the said electrolytes are plotted as a function of the temperature in FIG. 1, which indicates that the LiODFB is capable of providing high ionic conductivity. Cu and Al wires, which both have a diameter of 0.1 cm and have a length of 1.0 cm with a freshly scratched surface exposed to the solution, are respectively used to determine cathodic and anodic stability of the electrolytes since these are the most common materials for the current collector of the anode and cathode of lithium ion batteries. FIG. 2 shows that cathodic stability of the LiODFB electrolyte is only limited by plating and stripping of the metal lithium on Cu substrate due to the presence of lithium ions in the solution. FIG. 3 shows that Al can be very well passivated near 4.2 V versus Li+/Li, and that in the second sweep, the anodic currents ranged from zero up to 6.0 V. The above results prove that the LiODFB electrolytes are electrochemically stable for the operations of lithium ion batteries.

Example 3

Figure 4A:
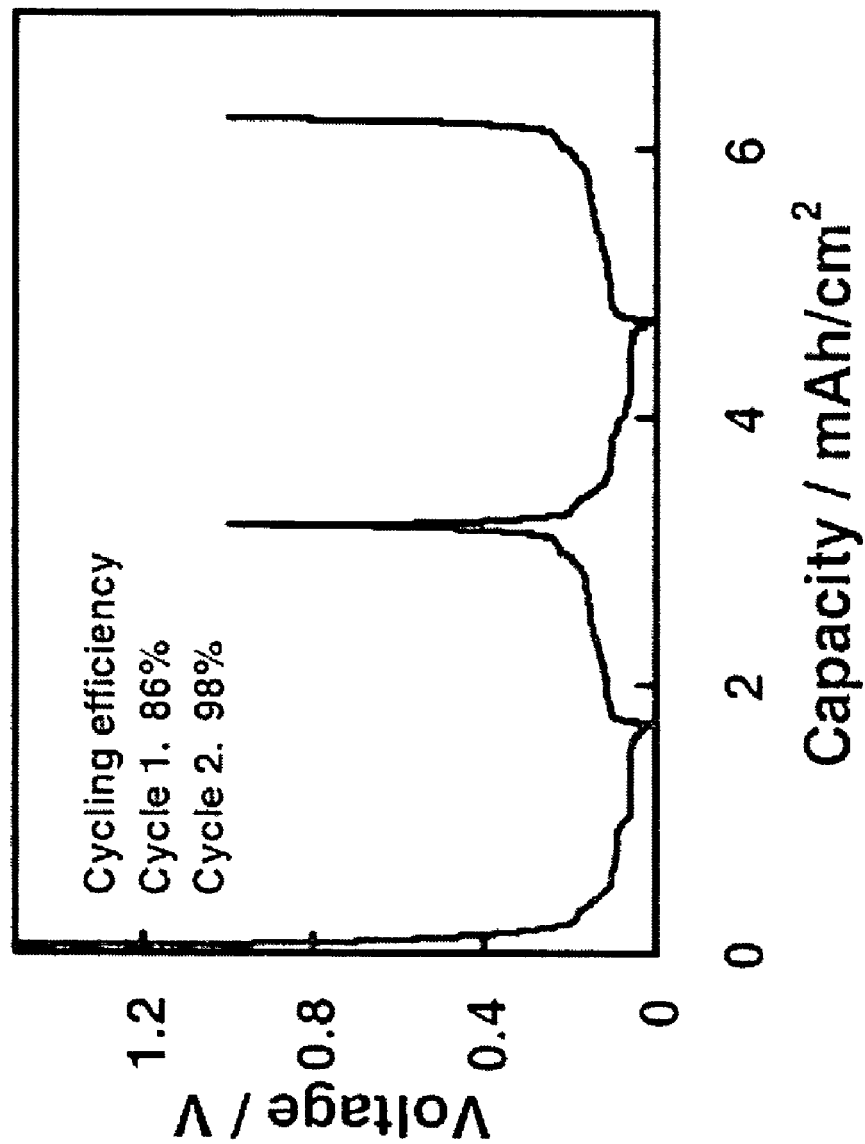
FIG. 4 is a plot showing cycling performance of Li/graphite half-cell in LiODFB electrolyte. (a) voltage curves of charge and discharge of the initial two cycles where cycle 1 is shown on the left of the graph and cycle 2 is shown on the right of the graph, and (b) plot of lithiation and delithiation capacities versus the cycle number.
Figure 4B:
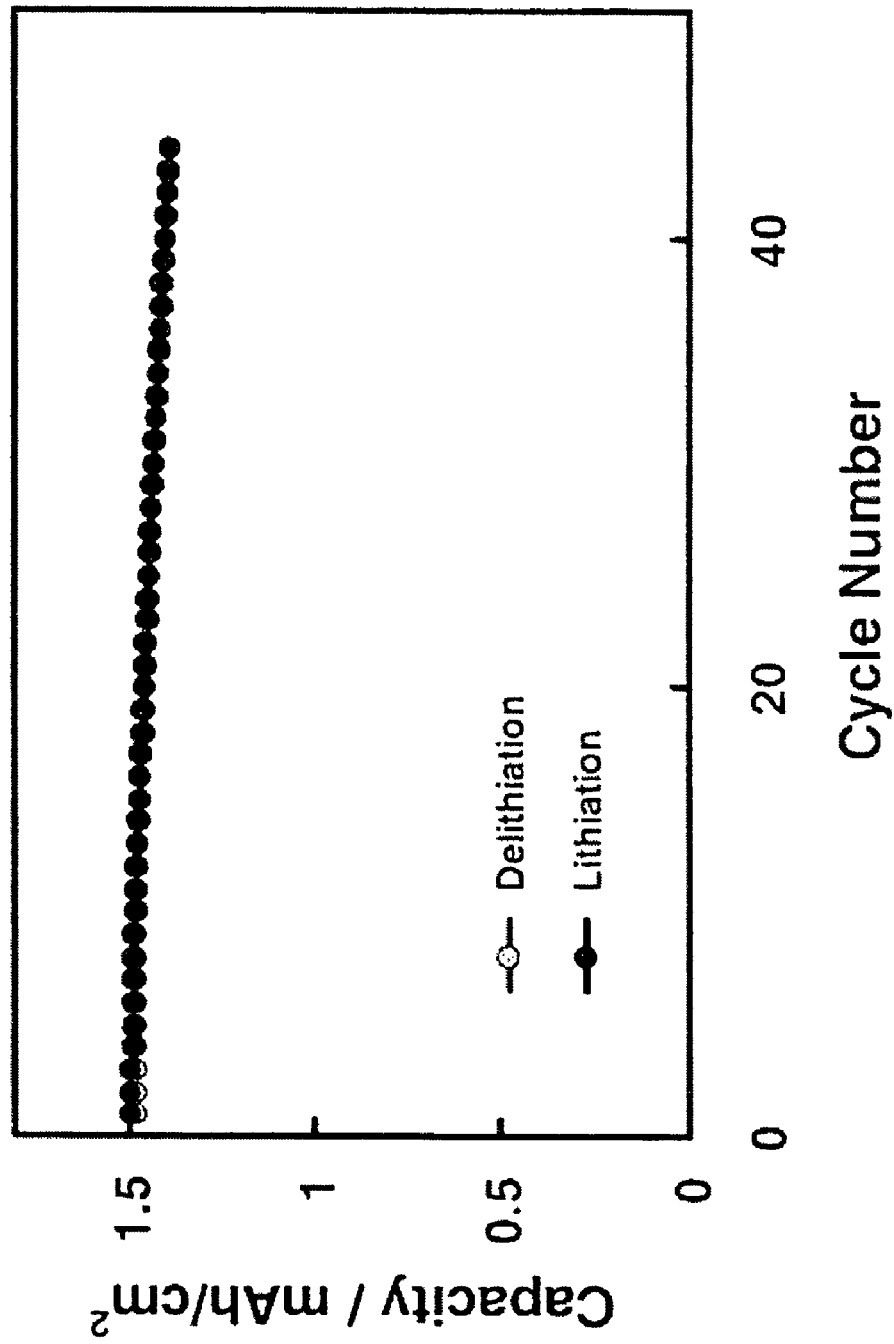
Figure 5A:
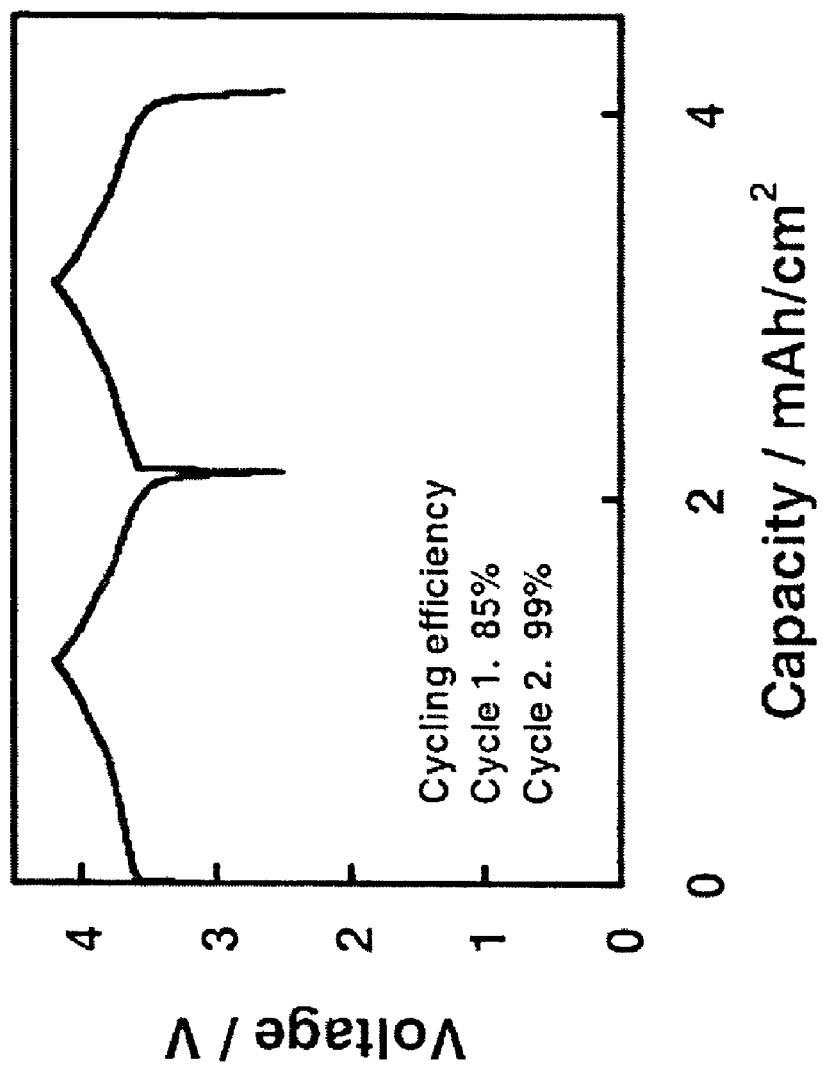
FIG. 5 is a plot showing cycling performance of Li/LiNi$_{0.8}$Co$_{0.2}$O$_2$ half-cell in LiODFB electrolyte. (a) voltage curves of charge and discharge of the initial two cycles, and (b) plot of charge and discharge capacities versus the cycle number.
Figure 5B:
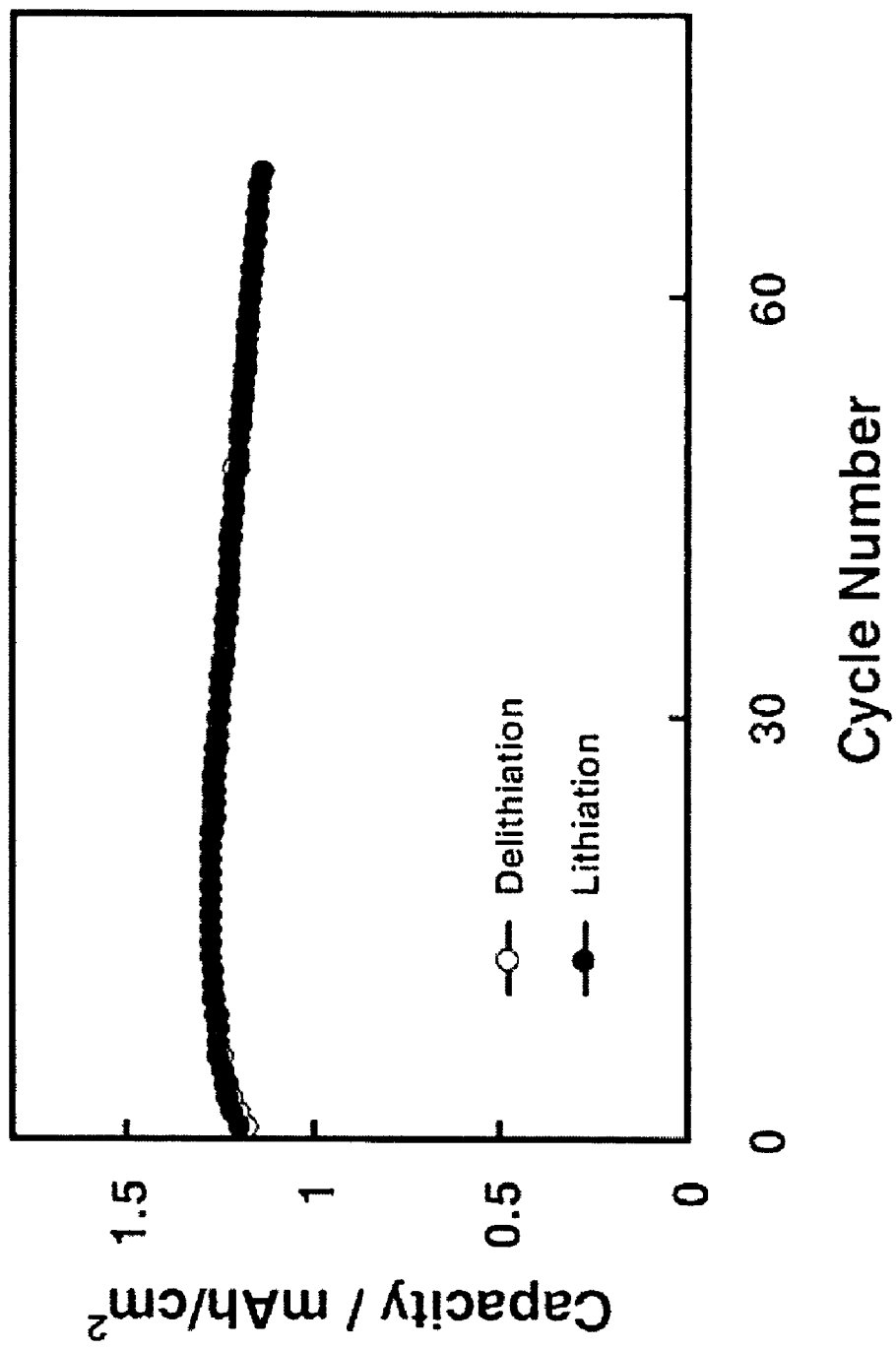

Li/graphite and Li/LiNi$_{0.8}$CO$_{0.2}$O$_2$ half-cells. The electrolyte having a composition of 1.0 molar LiODFB is dissolved in 3:3:4 PC-EC-EMC mixed solvent, as prepared in Example 2 and is used to assemble Li/graphite and Li/LiNi$_{0.8}$Co$_{0.2}$O$_2$ half-cells. These two cells are initially cycled two times at a current density of 0.1 mA/cm$^2$, then cycled at 0.5 mA/cm2 for all the following cycles. FIG. 4 and FIG. 5 show cycling performance of these two types of half-cells, respectively. It is shown that in the LiODFB electrolyte, both graphite and LiNi$_{0.8}$Co$_{0.2}$O$_2$ are reversibly cycled with a good capacity retention.

Example 4

Figure 6:
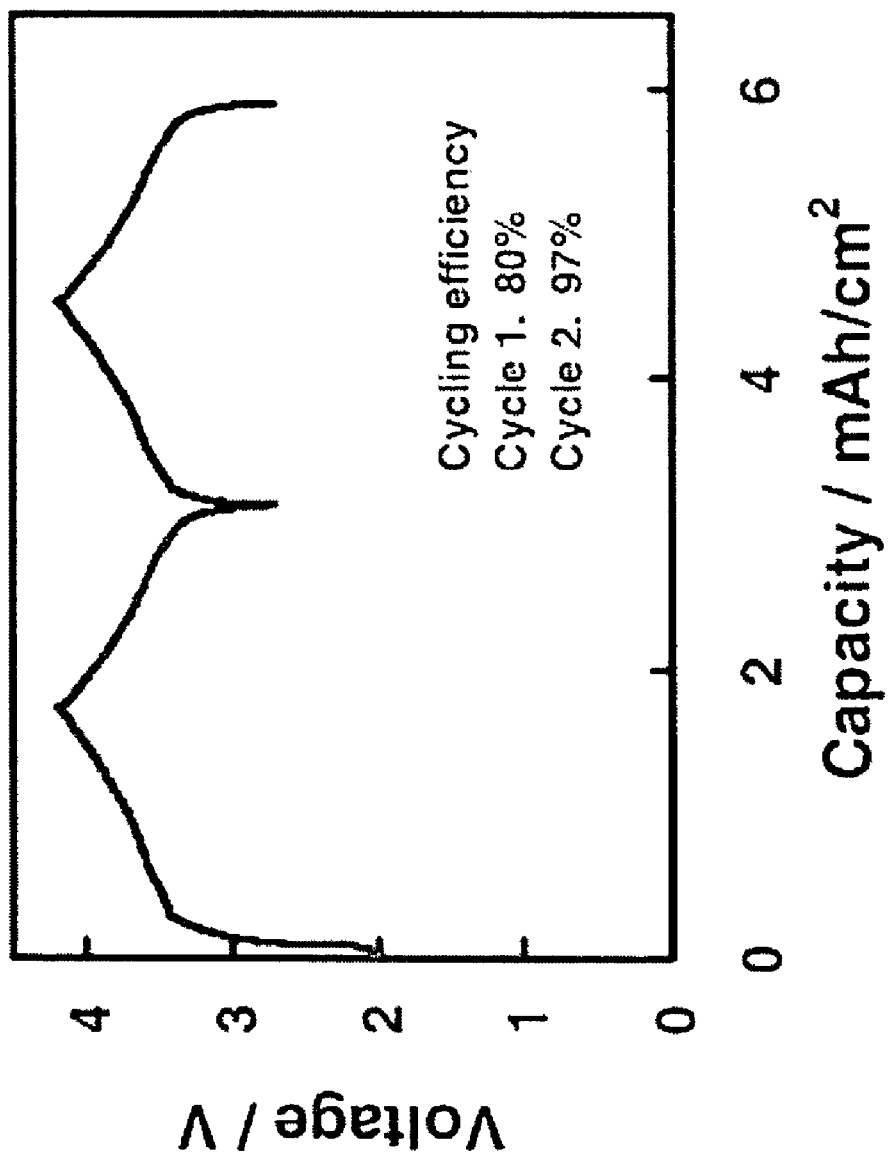
FIG. 6 is a plot showing voltage curves of charge and discharge of the initial two cycles of a graphite/LiNi$_{0.8}$Co$_{0.2}$O$_2$ lithium ion full cell using LiODFB electrolyte.
Figure 7:
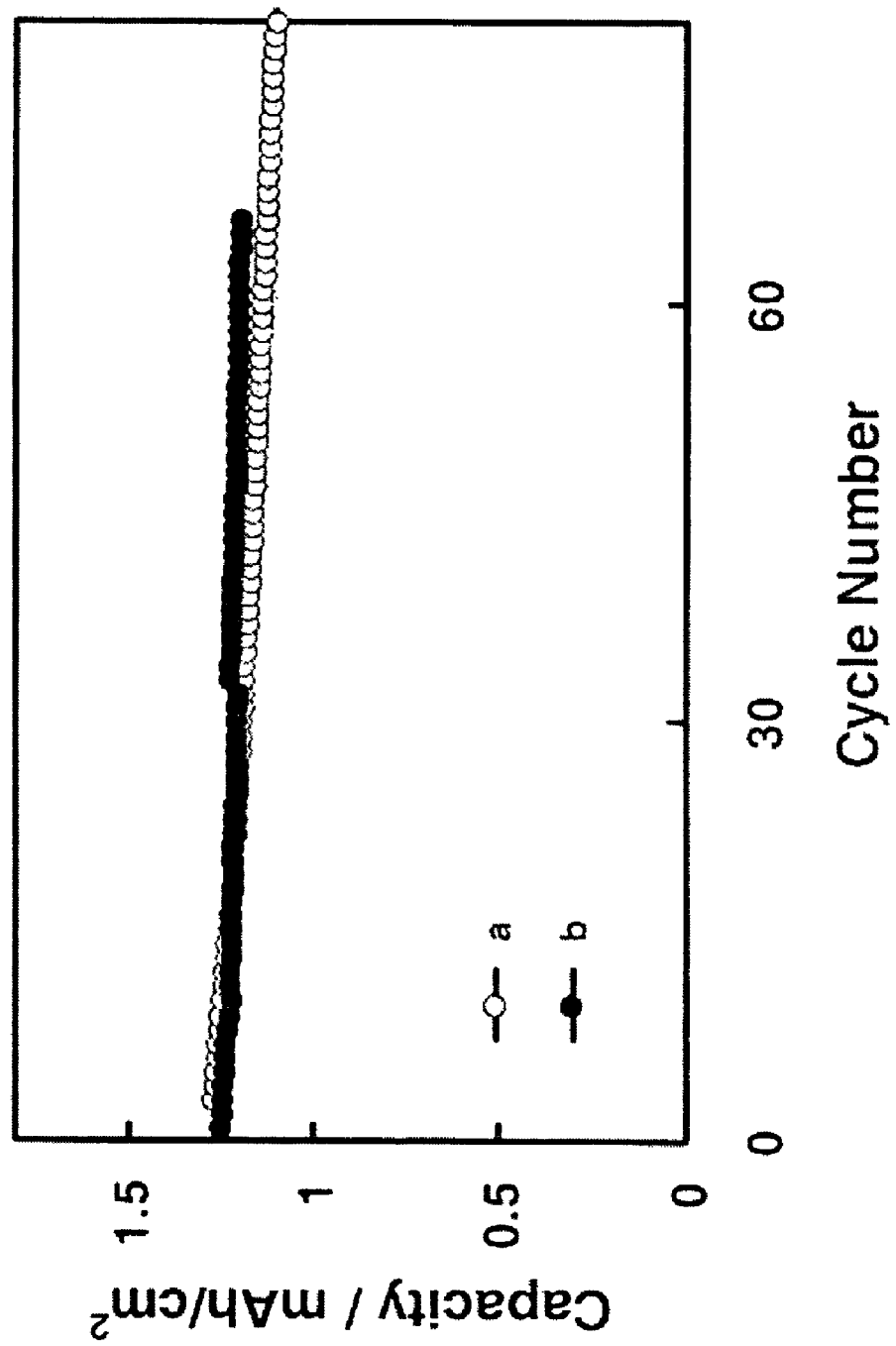
FIG. 7 is a plot showing discharge capacities versus the cycle number for the graphite/LiNi$_{0.8}$Co$_{0.2}$O$_2$ lithium ion full cell using LiODFB electrolyte. (a) room temperature (~23° C.), and (b) 60° C.

Lithium ion cells and their cycling performance. Using the electrolyte, graphite, and LiNi$_{0.8}$Co$_{0.2}$O$_2$ cathode, as described in Example 3, four identical lithium ion cells are assembled. All these four cells are formed two cycles at 0.1 mA/cm² between 2.5 V and 4.1 V. FIG. 6 shows voltage curves of the initial two forming cycles of such a typical cell. After two forming cycles, these cells are evaluated in the following conditions:

(1) Cell 1 is cycled at room temperature (~23° C.) and cell 2 at 60° C. with the same current density of 0.5 mA/cm² and voltage range of 2.5-4.1 V (FIG. 7).

Figure 8:
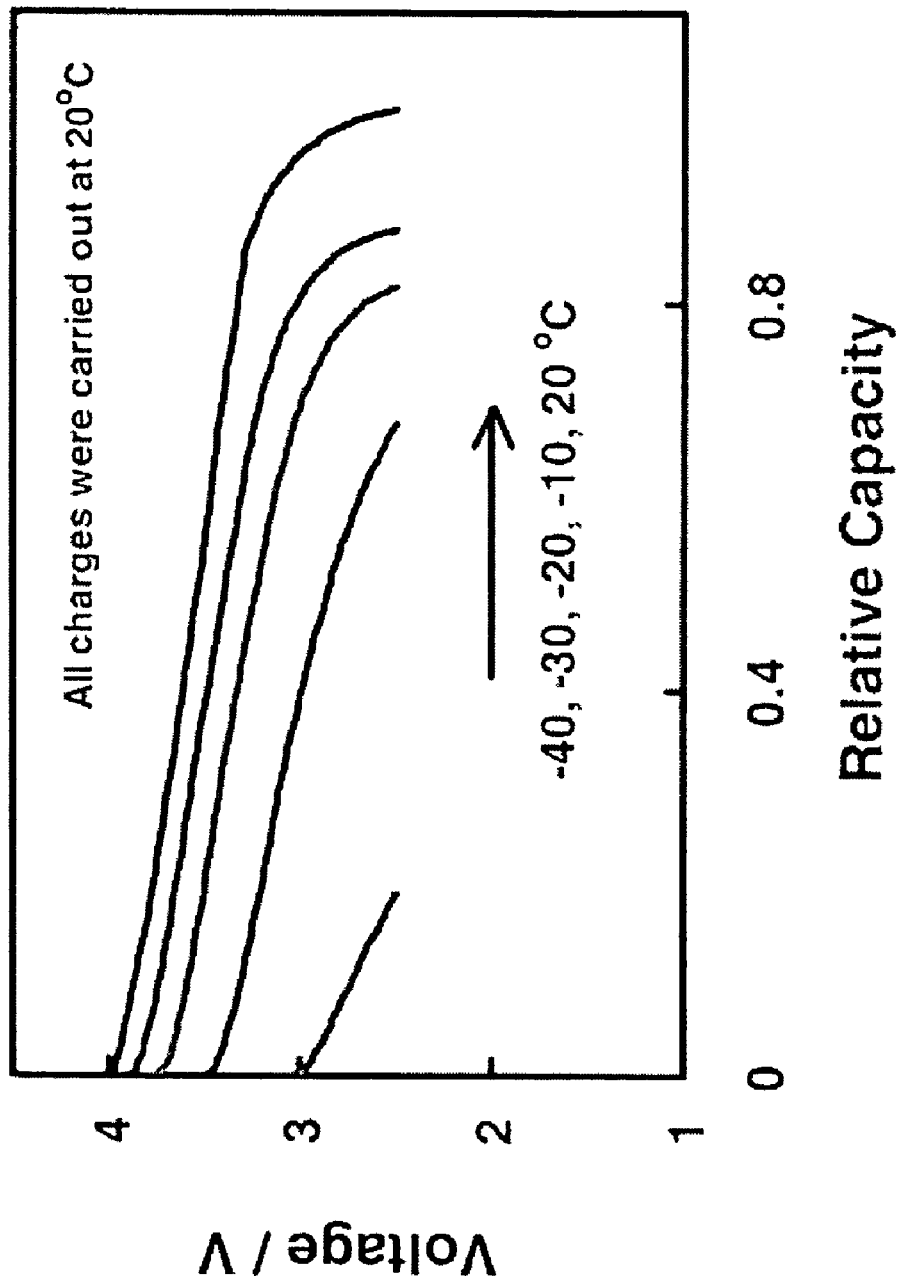
FIG. 8 is a plot showing discharge voltage curves of a graphite/LiNi$_{0.8}$Co$_{0.2}$O$_2$ lithium ion full cell using LiODFB electrolyte at various low temperatures.

(2) Cell 3 is charged at 20° C. and discharged at different low temperatures under the same current density of 0.5 mA/cm² between 2.5 V and 4.1 V (FIG. 8).

Figure 9:
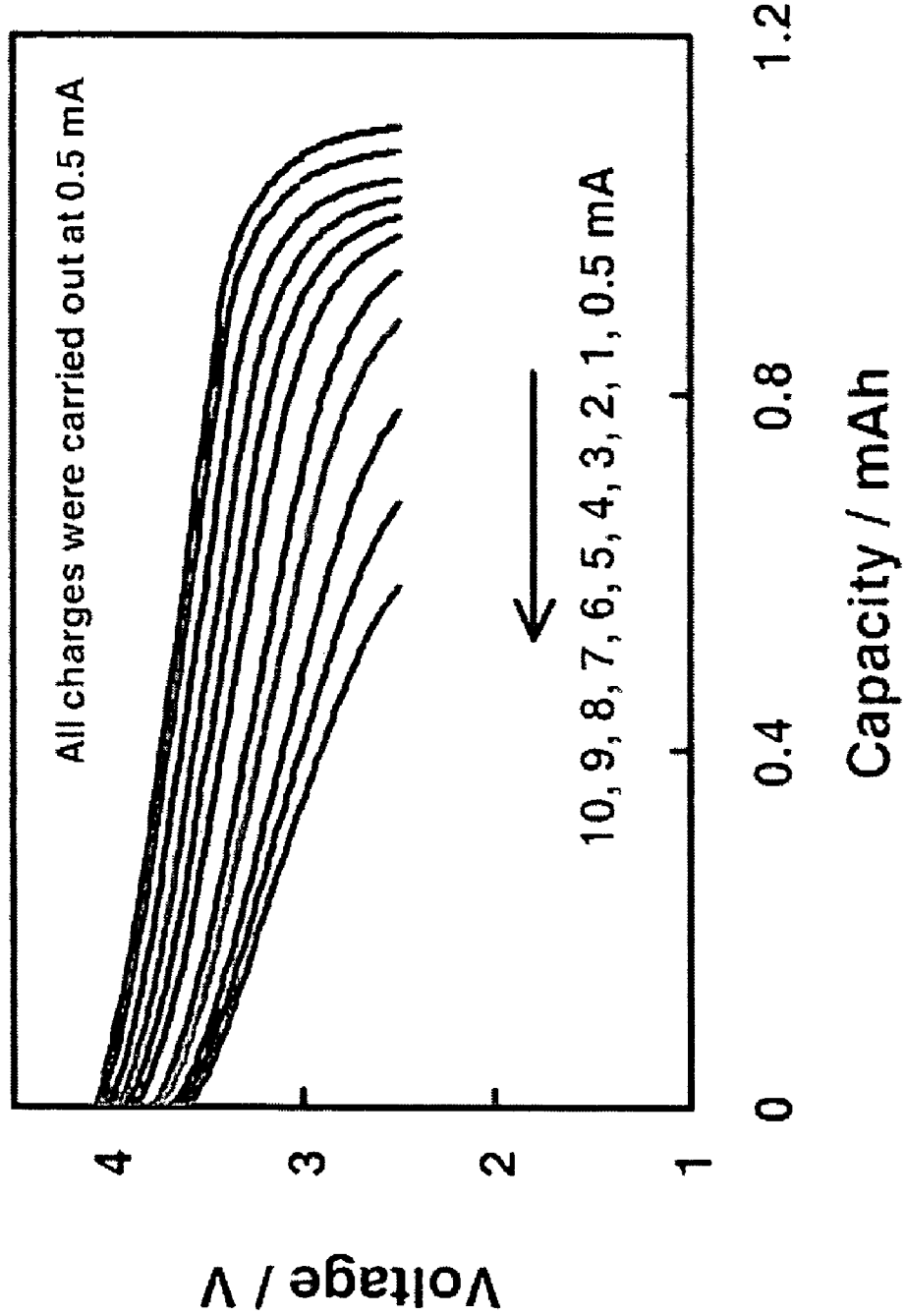
FIG. 9 is a plot showing discharge voltage curves of the graphite/LiNi$_{0.8}$Co$_{0.2}$O$_2$ lithium ion full cell using LiODFB electrolyte at various discharge current densities.

(3) Cell 4 is charged at 0.5 mA/cm² and discharged at different discharge current density at 20° C. between 2.5 V and 4.1 V (FIG. 9).

Example 5

Figure 10:
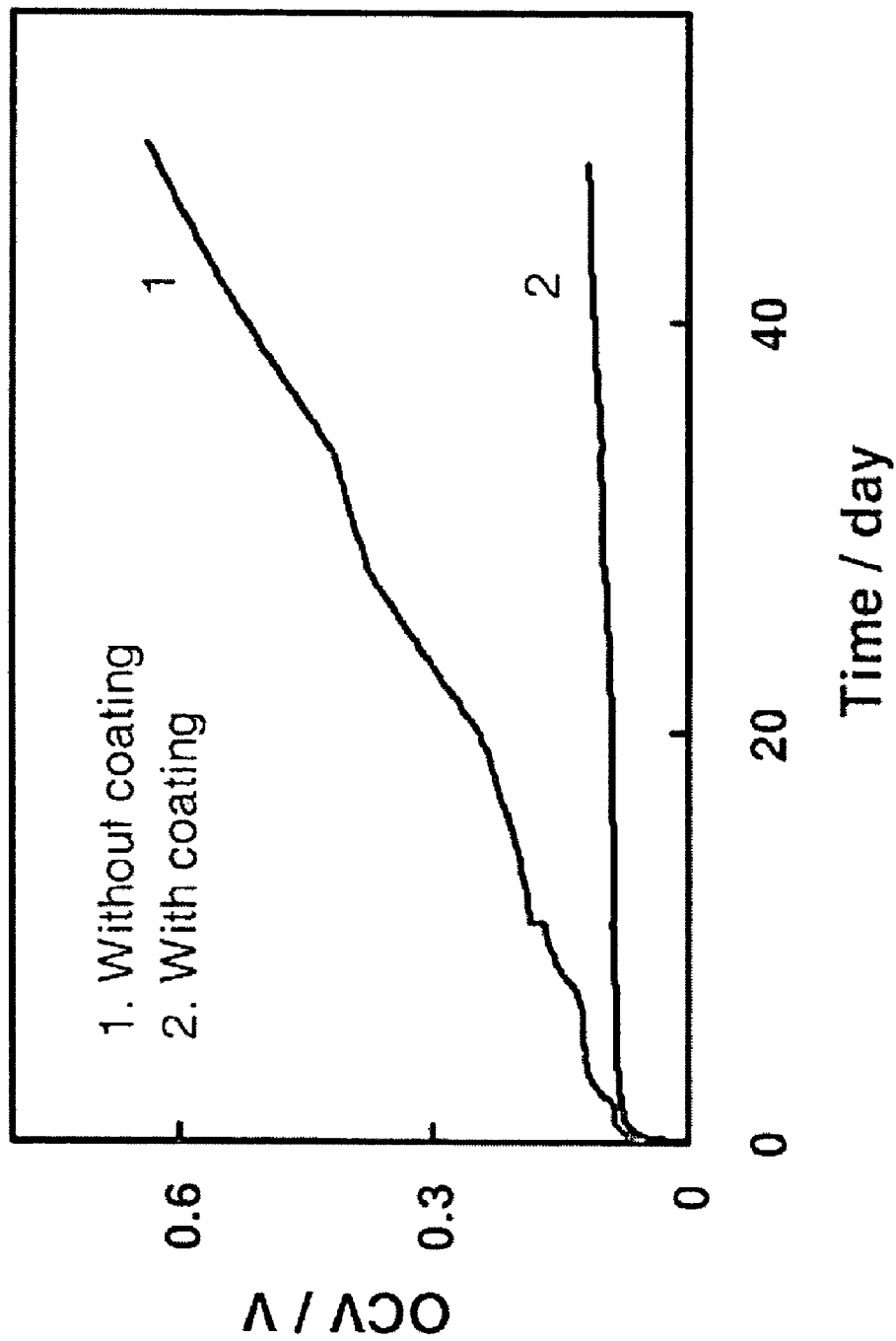
FIG. 10 is a plot showing an increase in the open-circuit voltage of the fully lithiated Li/graphite half-cells at 45° C.

Comparison of the Li/graphite half-cells without and with carboxyl borate coating. A graphite electrode as described in Example 3 was wetted with a mixed solution of 0.02 molar $H_3BO_3$ and 0.03 molar $H_2C_2O_4$ in methanol. After drying at room temperature, the electrode was further heated at 100-110° C. under vacuum for 16 h so that a carboxyl borate layer was coated on the surface of the graphite electrode. Two Li/graphite button cells with the same configuration but different graphite electrodes were assembled and filled with 150 µl of the liquid electrolyte composed of 1.0 molar $LiBF_4$ dissolved in a 1:1:3 (wt.) PC-EC-EMC mixed solvent. FIG. 10 compares a change in the open-circuit voltage of these two fully lithiated cells at 45° C. It is shown that graphite electrode coated with the carboxyl borate layer retains a stable open circuit voltage during the storage at 45° C.

FIG. 7 indicates that the LiODFB electrolyte makes it possible for lithium ion cell to be cycled at elevated temperatures. To compare cell performances at various conditions, a term of "relative capacity", which is taken as a ratio of the capacity obtained at a certain condition to that obtained at 20° C. and at 0.5 mA/cm², is used in FIG. 8 and FIG. 9. It is indicated that the lithium ion cell using LiODFB electrolyte not only has good low temperature performance (FIG. 8), but also has good high rate cycling performance (FIG. 9).

Any patents or publications mentioned in the specification are indicative of the levels of those skilled in the art to which the invention pertains. These patents and publications are herein incorporated by reference to the same extent as if each individual patent or publication was specifically and individually indicated to be incorporated by reference.

The preceding figures and description illustrate the general principles of the present invention and some specific embodiments thereof. These are not intended to be a limitation upon the practice of the present invention since numerous modifications and variations will be readily apparent to one skilled in the art upon consideration of the drawings and description. The following claims, including all equivalents thereof, are intended to define the scope of the invention.

The invention claimed is:

1. A process for preparing a halogenated borate comprising the steps of:
   forming a carboxyl borate through the reaction of boric acid with a carboxylic acid in a stoichiometric ratio of 3:2 wherein the carboxylic acid is oxalic acid; and
   reacting said carboxyl borate with a halide salt.

2. The process of claim 1 wherein said carboxylic acid is a diacid.

3. The process of claim 1 wherein said halide salt is a fluoride.

4. The process of claim 1 wherein the reaction of said carboxylic acid and said boric acid occurs through the steps of:
   dissolving said carboxylic acid and said boric acid in a solvent of water or alcohol;
   evaporating the solvent to form a dry mixture; and
   further heating the resulting mixture at 90-140° C. under vacuum for a time period ranging from three to twenty hours.

5. The process of claim 1 wherein the halide salt reaction with said carboxyl borate occurs at normal pressure at temperatures ranging from room temperature to the refluxing temperature of a solvent; wherein said solvent is selected from the group consisting of acetonitriles, ethers, tetrahydrofuran, carbonates and mixtures thereof.

* * * * *